(12) United States Patent
Wondra

(10) Patent No.: US 9,378,140 B2
(45) Date of Patent: Jun. 28, 2016

(54) LEAST DISRUPTIVE CACHE ASSIGNMENT

(71) Applicant: Citrix Systems, Inc., Fort Lauderdale, FL (US)

(72) Inventor: Ralph Alexander Wondra, Burlingame, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 124 days.

(21) Appl. No.: 14/473,307

(22) Filed: Aug. 29, 2014

(65) Prior Publication Data

US 2016/0062888 A1 Mar. 3, 2016

(51) Int. Cl.
*G06F 12/08* (2006.01)

(52) U.S. Cl.
CPC ........ *G06F 12/0806* (2013.01); *G06F 12/0804* (2013.01); *G06F 2212/1044* (2013.01); *G06F 2212/283* (2013.01); *G06F 2212/6046* (2013.01)

(58) Field of Classification Search
CPC ............ G06F 12/0806; G06F 12/0804; H04L 29/08144
USPC .................................. 711/119, 130; 709/226
See application file for complete search history.

(56) References Cited

U.S. PATENT DOCUMENTS

| | | | | |
|---|---|---|---|---|
| 6,601,084 B1 * | 7/2003 | Bhaskaran et al. | ........... | 718/105 |
| 6,683,873 B1 * | 1/2004 | Kwok et al. | .................. | 370/389 |
| 7,069,324 B1 * | 6/2006 | Tiwana et al. | ................ | 709/226 |
| 2006/0294318 A1 * | 12/2006 | Percival | ........................ | 711/141 |
| 2008/0120433 A1 * | 5/2008 | Cieslak et al. | ................ | 709/238 |
| 2008/0320222 A1 * | 12/2008 | Dhodapkar | ................... | 711/118 |

* cited by examiner

*Primary Examiner* — Than Nguyen
(74) *Attorney, Agent, or Firm* — Finnegan, Henderson, Farabow, Garrett & Dunner, LLP

(57) ABSTRACT

The embodiments are directed to methods and appliances for assigning communication network caches. The methods and appliances can assign storage buckets to caches in a manner that is minimally disruptive to all cache assignments. The methods and appliances can determine a minimum number of cache assignments and reassignments to perform based on a plurality of factors including a number of caches added and removed to a communication network during a given time period, a number of buckets in the communication network, and current cache assignment information. The methods and appliances determine a quantity of buckets to be assigned to each cache, and a quantity of extra buckets to assign, and selectively choose certain buckets for reassignment.

15 Claims, 8 Drawing Sheets

| Buckets | 1: A arrives | 2: B arrives | 3: C arrives | 4: D arrives |
|---|---|---|---|---|
| 0 | A | B | C | C |
| 1 | A | B | B | B |
| 2 | A | A | A | D |
| 3 | A | A | A | A |

402 ⇒ 404 ⇒ 406 ⇒ 408

= Bucket assignment changed

| Buckets | 1: A arrives | 2: B arrives | 3: C arrives | 4: D arrives | 5: C leaves |
|---|---|---|---|---|---|
| 0 | A | B | C | C | B |
| 1 | A | B | B | D | D |
| 2 | A | B | B | B | B |
| 3 | A | B | B | B | B |
| 4 | A | A | C | C | A |
| 5 | A | A | A | D | D |
| 6 | A | A | A | A | A |
| 7 | A | A | A | A | A |

502 ⇒ 504 ⇒ 506 ⇒ 508 ⇒ 510

= Bucket assignment changed

LEAST DISRUPTIVE CACHE ASSIGNMENT

BACKGROUND

The rise of distributed computing systems has advanced data processing and storage technologies far beyond the capabilities of the personal computer. High-speed communication networks enable widespread use of cloud computing—networked computing using shared or remote resources, software, and/or information. Cloud computing systems enable businesses and individuals to enjoy the benefits of virtual desktops by decentralizing the computer platform utilizing remote or dispersed hardware infrastructures, and transmitting virtual desktop data to client devices such as mobile devices.

As the number of users rises and the size of data files grows, the demand for increased processing and transmission speed in local area networks (LANs) and wide area networks (WANs) increases dramatically. Cloud service providers strive to answer the ever-increasing performance demands by building more robust communication networks with increased bandwidths and transmission speeds, and by increasing the efficiency of resource allocation efficiency. One common resource in communication networks is the cache—such as a physical memory cache appliance or storage location that stores frequently accessed data, to enable faster subsequent retrieval.

Typical communication networks include multiple cache appliances managed by one or more electronic devices such as routers. In some network systems, each cache appliance is assigned an Internet Protocol (IP) address, and the routers employ one or more assignment protocols to direct data to and from the cache appliances using the cache IP addresses. Particularly, the assignment protocol assigns each cache appliance, via its IP address, to one or more "buckets"—data storage addresses in the network in a process sometimes referred to as "cache assigning" or "bucket mapping." The cache assignment algorithms are sometimes referred to as "mapping algorithms." The efficiency of the assignment algorithm can have a profound effect on the cloud computing service performance, by affecting the amount of time and processing power required to assign buckets and caches in a large network. The algorithm's impact on efficiency is most profound when cache appliances are added or removed from the network, and the remaining and new caches must undergo reassignment while online.

Common assignment protocols, such as the Web Cache Coordination Protocol (WCCP) developed by Cisco Systems, direct data between multiple cache appliances and reassign caches while the network is online One cache in the network serves as a designated cache, to handle assignment operations for distributing data throughout the remaining caches. WCCP employs one or more algorithms to assign buckets to caches, and to handle cache additions or removals by reassigning the buckets. Many current algorithms assign buckets to caches by sorting cache IP addresses, and assigning caches in order of their IP address. When a cache is removed or added, these algorithms usually reassign many, if not all, of the caches according to the sorted IP list, thereby disrupting caching operations and increasing data loss risks. Due to the inefficiencies of this assignment method, network performance suffers.

In view of the shortcomings and disadvantages of current cache assignment methods, an improved method for assigning caches is desired.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

As discussed earlier, communication networks assign storage buckets to cache appliances, to instruct network routers where to direct traffic. Cache assignment is usually performed with the use of an assignment algorithm. Typical cache assignment algorithms sort all cache IP addresses, and assign buckets to caches sequentially through the sorted list by cycling through the sorted list until all buckets are assigned to caches. Adding or deleting a cache from the sorted list may cause the assignments to shift up or down the sorted list, depending on which cache is changed. For example, when changing a cache near the top of the sorted list, many if not all assignments may be affected, requiring the system to re-assign numerous caches, and compromising system performance. Upon reassignment, data streams in transit to or from the re-assigned cache may be lost, requiring retransmission.

An alternative approach has been created that reduces the amount of time and computational resources necessary for assigning and reassigning caches, and that reduces the risk of data loss. The least disruptive assignment (LDA) method disclosed herein maximizes the efficiency of both small and large networks by optimizing cache assignments. Cache assignments can be optimized by reducing the number of reassignments required when new caches are added or existing caches are removed from the network. Embodiments of the LDA method disclosed herein minimize the changes to existing cache assignments by determining the minimum number of buckets or cache reassignments necessary upon adding or removing the changing cache, thereby increasing performance over typical cache assignment methods.

Figure 1:
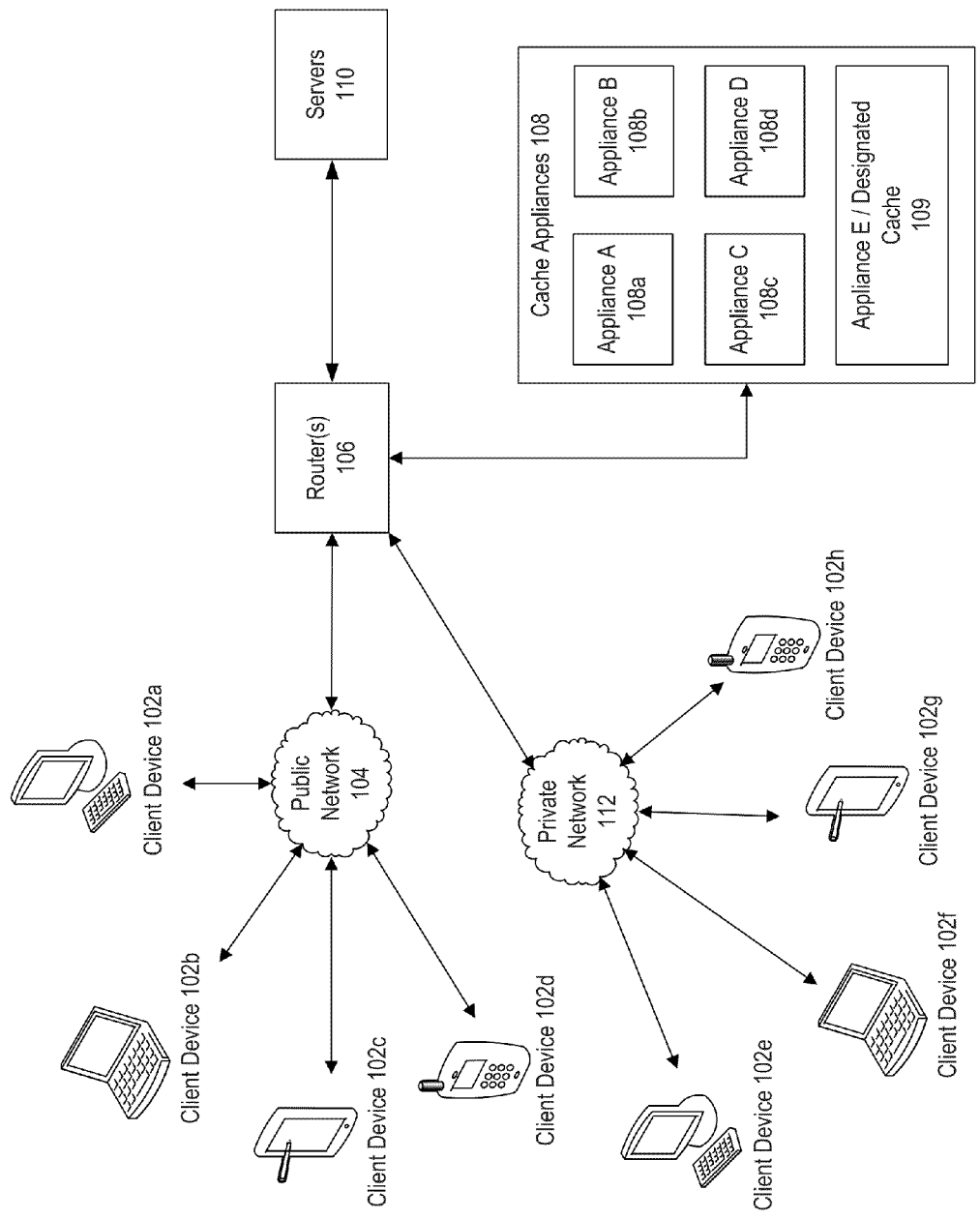
FIG. 1 is a block diagram of an exemplary communication network, consistent with the embodiments of the present disclosure.

FIG. 1 is a block diagram of an exemplary communication network 100. Those of ordinary skill in the art will appreciate that communication network 100 can be any type of network that utilizes memory cache devices for caching transmitted data. Communication network 100 can include one or more client devices 102, a public network 104, a router 106, a plurality of appliances 108, one of which is a designated cache 109, one or more servers 110, and a private network 112. For brevity, communication network 100 is referred to hereinafter as network 100.

One or more client devices 102 are devices that can acquire remote services from servers 110 through various means. Client devices 102 can communicate with servers 110 through a public network 104 (e.g., client devices 102a-d) or a private network 112 (e.g., client devices 102e-h). While client devices 102 are portrayed as a computer (e.g., client devices 102a and 102e), a laptop (e.g., client devices 102b and 102f), a tablet (e.g., client devices 102c and 102g), and a mobile smart phone (e.g., client devices 102d and 102h), it is appreciated that client device 102 could be any type of device that can send and receive signals to and from servers 110.

Router 106 is a physical device, or is software that is part of a physical device configured to direct data traffic between servers 110, appliances 108, and client devices 102 via public network 104 and/or private network 112. Router 106 receives cache assignment information from a designated cache 109 in the group of appliances 108, and directs frequently-accessed data to and from appliances 108 based on the cache assignment information. Additionally, router 106 can direct incoming data traffic from client devices 102 to appliances 108 and/or servers 110, and direct outgoing data traffic from servers 110 to appliances 108 and/or client devices 102. In some embodiments, network 100 may include multiple routers 106, operating in parallel or series, to handle the amount of data traffic required by client devices 102 and/or servers 110.

Cache appliances ("appliances") 108 are devices that optimize network traffic by caching data. In some embodiments, appliances 108 optimize network traffic by storing frequently-accessed data, removing the need to repeatedly query servers 110 for the same data. Appliances 108 may include, for example, a plurality of cache appliances such as Appliances A-E (108a-108d and 109), working in conjunction with or in cooperation with one another to optimize network traffic and data caching. One appliance, such as Appliance E 109, may be identified as a designated cache. Designated cache 109 monitors the appliances 108 in network 100, and assigns storage locations, called buckets, to appliances 108. Designated cache 109 can reassign caches and buckets when network 100 configuration changes, such as when one or more appliances 108 are removed or added to network 100. For example, if one of appliances 108 fails, and is removed from network 100, designated cache 109 can reassign buckets to the remaining caches. Similarly, designated cache 109 can reassign buckets to a new cache appliance added to network 100. In some embodiments, appliances 108 and 109 may be virtual appliances. In some embodiments, the functionality of router 106 may be located within one of appliances 108a-d or designated cache 109.

Appliances 108 may include hardware components (not shown in figures) such as, for example, a central processing unit (CPU), a cache memory and an instruction memory. The CPU can be any logic circuitry that responds to and processes instructions fetched from instruction memory. The CPU can be a single or multiple microprocessors, field-programmable gate arrays (FPGAs), or digital signal processors (DSPs) capable of executing particular sets of instructions stored in a memory (e.g., the instruction memory). The cache memory and instruction memory include one or more tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. The cache memory and instruction memory can be one or more memory chips capable of storing data and allowing any storage location to be directly accessed by the CPU, such as any type of random access memory (RAM), or any other available memory chip capable of operating as described herein. In some embodiments, the CPU communicates with the cache memory and instruction memory via a system bus. Appliances 108 can also communicate with network 100 via a wired or wireless interface. The interface can comprise a built-in network adapter, network interface card, PCMCIA network card, card bus network adapter, wireless network adapter, USB network adapter, modem or any other device suitable for interfacing appliances 108 to any type of network capable of communication and performing the operations described herein. In some embodiments, appliances 108 can communicate directly with routers 106, and routers 106 interface to networks 104 and 112, and servers 110, via one or more of a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

Servers 110 are entities that can be represented by any electronic addressable format, and can exist as a single entity or a member of a server farm. Servers 110 can be a physical server or a virtual server. In some embodiments, servers 110 can include a hardware layer, an operating system, and a hypervisor creating or managing one or more virtual machines. Servers 110 provide one or more services, such as one or more applications, to one or more endpoints (e.g., client devices 102a-h). For example, provided applications may include Windows™-based applications and computing resources, such as a virtual desktop or interface application to a remote data repository. Such exemplary applications are commonly associated with cloud computing.

As mentioned, provided services may include providing one or more virtual desktops that can provide one or more applications. Virtual desktops can include hosted shared desktops allowing multiple users to access a single shared Remote Desktop Services desktop, virtual desktop infrastructure desktops allowing each user to have their own virtual machine, streaming disk images, a local virtual machine, individual applications (e.g., one or more applications), or a combination thereof.

Servers 110 may include or interface with a backend system (not shown), comprising a single or multiple instances of computer networking hardware, appliances, or servers in a server farm or a bank of servers. For example, backend system 130 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Exemplary backend systems may also include, among other things, an Oracle backend server, a SQL Server backend, and/or a dynamic host configuration protocol (DHCP).

Public network 104 may include, for example, a Wide Area Network (WAN), the Internet, or any network generally accessible to the public. Private network 112 may include, for example, a Local Area Network (LAN), or any network that is closed to the general public and accessible only to a particular group of client devices 102, such as client devices 102e-h. Those of ordinary skill in the art will understand that public network 104 and private network 112 may include hardware and software components consistent with different types of known networks such as, for example, routers, switches, transceivers, communication protocols, firewalls, etc.

Figure 2A:
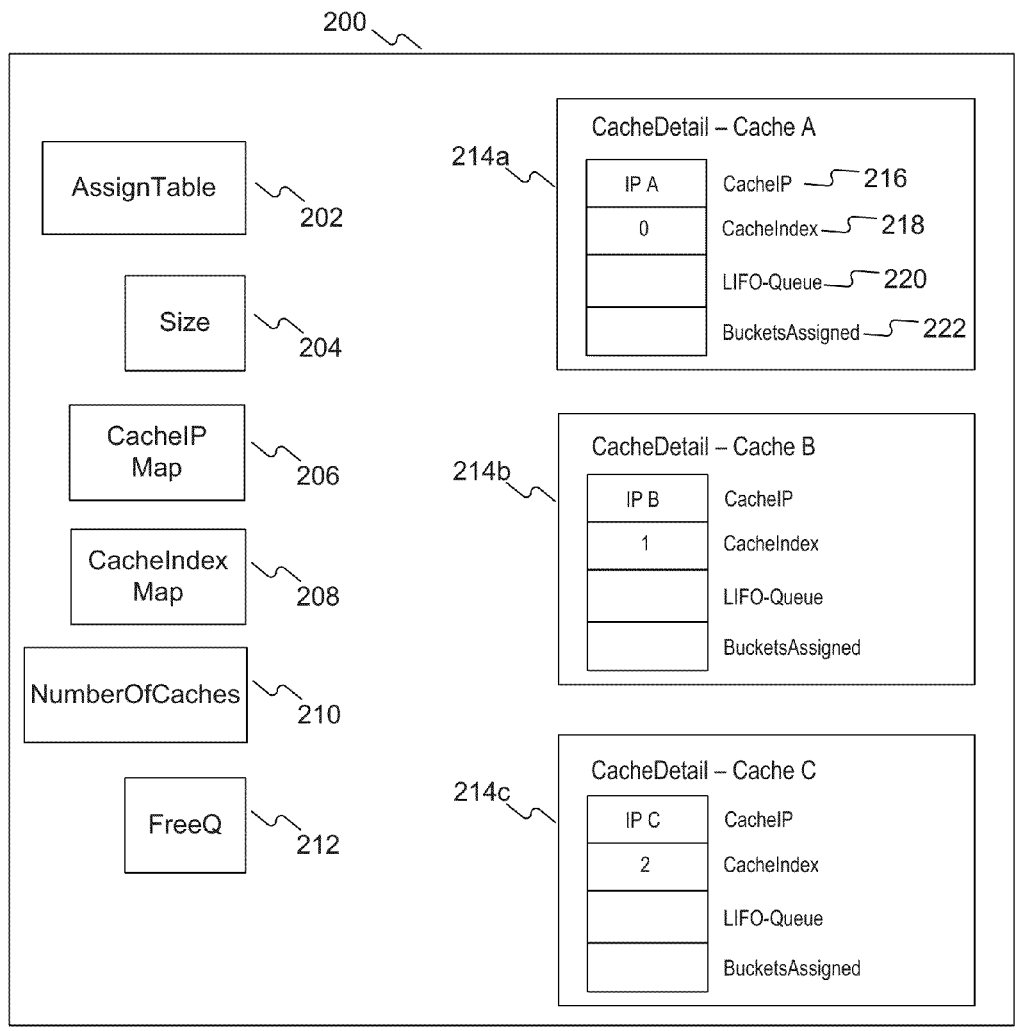
FIG. 2A is block diagram of an exemplary assignment data structure, consistent with the embodiments of the present disclosure.

FIG. 2A is a block diagram of an exemplary basic data structure 200 used in embodiments of the LDA algorithm. Data structure 200 contains pre-configured and variable information used for assigning caches and buckets, for configuring and reconfiguring network 100. In some embodiments, data structure 200 is generated or modified when cache assignments are changed, such as when one or more cache appliance 108 is added or removed from network 100. Data structure 200 may be stored in router 106 and/or one or more appliances 108, such as a designated cache 109. In some embodiments, data structure 200 may be stored remotely from router 106 and appliances 108, and accessed over a local or remote communication link. In some embodiments, data structure 200 includes information including, for example:

AssignTable 202: An array of bucket and cache assignments. AssignTable 202 can be generated as the product of a cache assignment algorithm such as the LDA method. Information included in AssignTable 202 can indicate which buckets are to be assigned to which caches appliances 108. AssignTable 202 is variable and changes when cache appliances are added or removed from network 100. In some embodiments, designated cache 109 generates AssignTable 202 using an LDA method, such as method 300 illustrated in FIGS. 3A-3C. Router 106 can use AssignTable 202 to associate buckets with caches, and direct data traffic to and from appliances 108.

Size 204: A number of total buckets in AssignTable 202. Size 204 can be predetermined, or input by an individual configuring network 100, and once configured, size 204 is generally a fixed quantity of buckets.

CacheIP Map 206: An index of caches in network 100, organized by a CacheIP address such as CacheIP 216 (discussed later), for each cache appliance 108. CacheIP Map 206 can be used by designated cache 109 and/or router 106 to quickly locate a particular appliance 108 and retrieve CacheDetail information (discussed later) for a particular appliance 108 by searching CacheIP Map 206 for a particular CacheIP 216.

CacheIndex Map 208: An index of caches in network 100, organized by a CacheIndex value such as CacheIndex 218 (discussed later), for each cache appliance 108. CacheIndex Map 208 can be used by designated cache 109 and/or router 106 to quickly locate a particular appliance 108 and retrieve CacheDetail information (discussed later) for a particular appliance 108 by searching CacheIndex Map 208 for a particular CacheIndex 218. Those of ordinary skill in the art will understand that data structure 200 can include additional maps for organizing cache information using other identifiers.

NumberOfCaches 210: A number of total active caches in network 100. This quantity changes when caches are added or removed from network 100. In some embodiments, this number may be equal to the number of appliances 108, minus an appliance identified as the designated cache, such as designated cache 109. In the exemplary network 100 shown in FIG. 1, NumberOfCaches 210 may equal 4, because appliances A-D (108a-108d) are available caches, whereas appliance E 109 serves as a designated cache for configuring network 100. In some embodiments, NumberOfCaches 210 can account for designated cache 109, although designated cache 109 may not be used for data caching. Notably, NumberOfCaches 210 also represents a total count of the caches represented in CacheIP map 206 or CacheIndex map 208.

FreeQ 212: A quantity of buckets and the corresponding bucket identifiers for buckets available for assignment or reassignment. FreeQ 212 can include buckets that have yet to be assigned (such as when network 100 is configured for the first time), as well as buckets that are currently assigned to a cache that was removed, thereby indicating that the buckets are available for reassignment. For example, in some embodiments, if designated cache 109 has never performed a cache assignment, and has not received data structure 200 from a previous designated cache, then FreeQ 212 may contain bucket identifiers for all of the buckets, from 0 to (Size-1), and a quantity of buckets equal to the value of Size 204.

CacheDetail 214a-214c: An information structure containing attributes for a cache. Each cache in network 100, such as appliances 108, may have a CacheDetail 214 entry in data structure 200, such as CacheDetail 214a for cache A, CacheDetail 214b for cache B, and CacheDetail 214c for cache C. In some embodiments, data structure 200 may not include a CacheDetail 214 entry for designated cache 109. In other embodiments, data structure 200 can include a CacheDetail 214 for designated cache 109, and a notation identifying designated cache 109 as the designated cache. CacheDetail 214a-214c may include information about a cache appliance 108 such as items 216-222:

CacheIP 216: An Internet Protocol (IP) address assigned to a cache appliance 108, which allows router 106 to direct traffic to and from a particular appliance 108. CacheIP 216 can be pre-programmed in appliance 108, and transmitted to designated cache 109 and/or router 106 upon adding the appliance 108 to network 100. In some embodiments, CacheIP can be set by designated cache 109 or router 106, upon detecting the newly-added appliance 108. In most embodiments, CacheIP 216 is set once, and fixed for the duration of time that the appliance 108 is active in network 100.

CacheIndex 218: An identifier assigned to the cache appliance 108, usually assigned by designated cache 109 or router 106. CacheIndex 218 can serve as a sequential identifier for each appliance 108 in network 100, where the CacheIndex 218 value is assigned when the cache appliance 108 is added to network 100. In some embodiments, the values for CacheIndex 218 range from 0 to the number of buckets (Size 204 minus 1).

Last-In-First-Out (LIFO) Queue 220: A structure, such as a table or array, that identifies the one or more buckets currently assigned to the cache appliance 108. LIFO queue 220 can be organized according to an order in which the buckets were assigned to the cache appliance, allowing designated cache 109 to recognize the bucket(s) that were most recently assigned to the particular cache appliance 108.

BucketsAssigned 222: A quantity of buckets currently assigned to the cache appliance 108. The quantity can equal the number of buckets identified in LIFO queue 220. BucketsAssigned 222 can change when caches are assigned or reassigned, based on the results of the LDA method 300 (depicted in FIGS. 3A-3C).

Figure 2B:
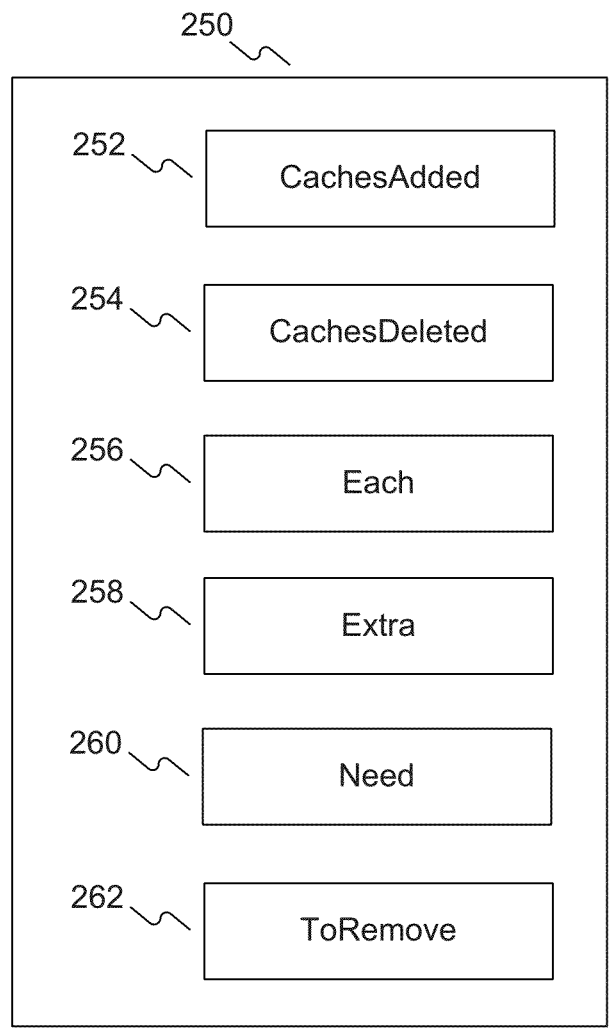
FIG. 2B is block diagram of exemplary least disruptive assignment variables, consistent with the embodiments of the present disclosure.

FIG. 2B is a block diagram of exemplary LDA variables 250, consistent with disclosed embodiments. In some embodiments, designated cache 109 can receive or generate LDA variables 250 while performing one or more disclosed methods, such as LDA method 300. In some embodiments, LDA variables 250 can be included within data structure 200. Designated cache 109 can store LDA variables 250 in a local memory, or can access LDA variables 250 from a remote location in network 100. LDA variables 250 may include, for example, CachesAdded 252, CachesDeleted 254, Each 256, Extra 258, Need 260, and ToRemove 262. LDA variables 250 are defined and explained in detail throughout the description of FIGS. 3A-3C.

Figure 3A:
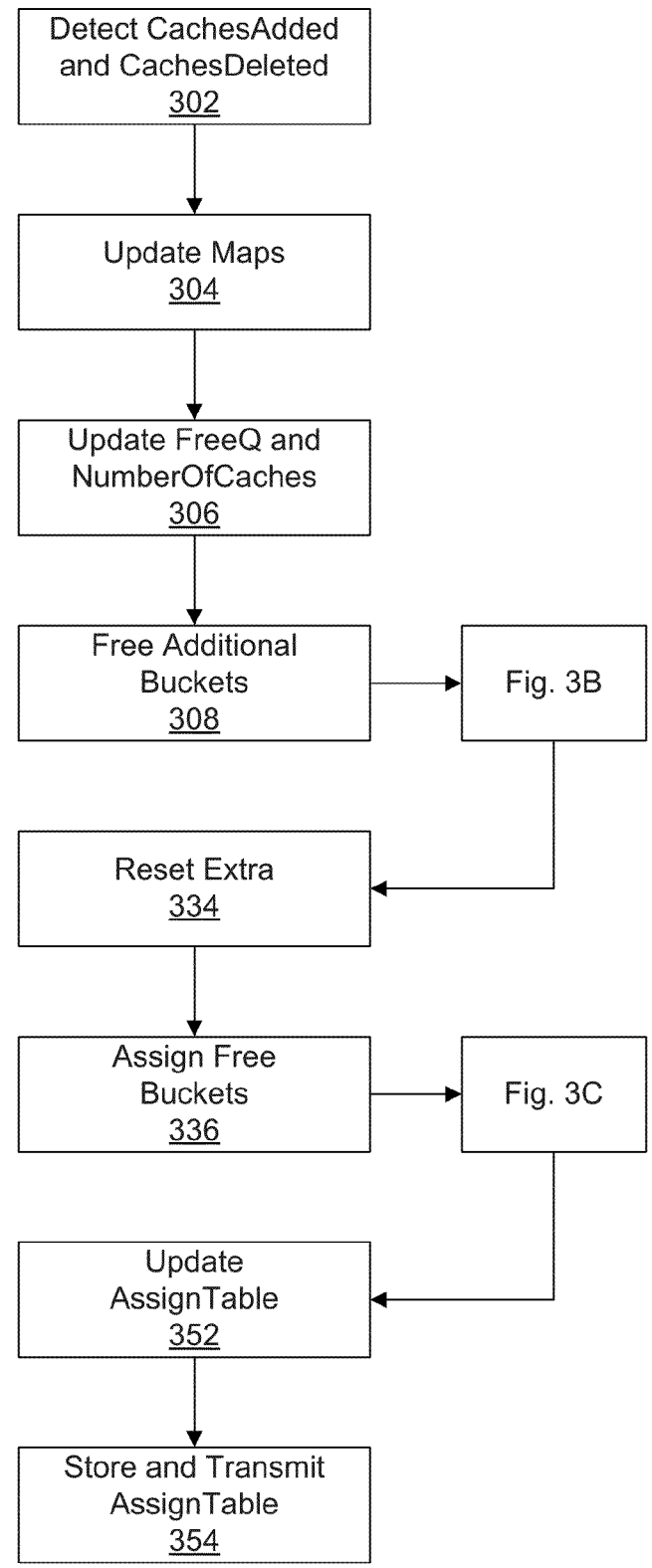
FIGS. 3A-3C are flowcharts representing an exemplary method for assigning caches, consistent with the embodiments of the present disclosure.
Figure 3B:
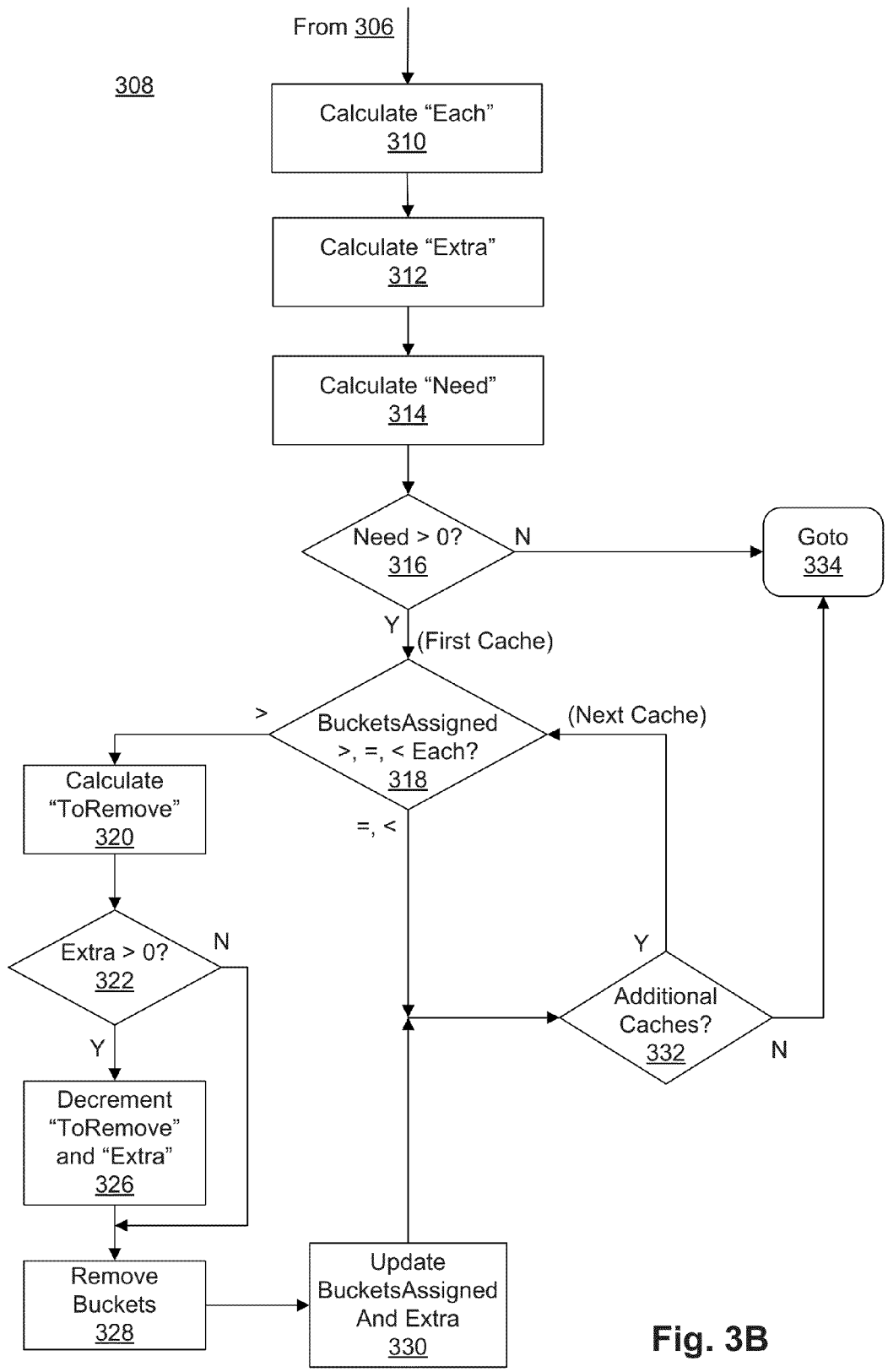
Figure 3C:
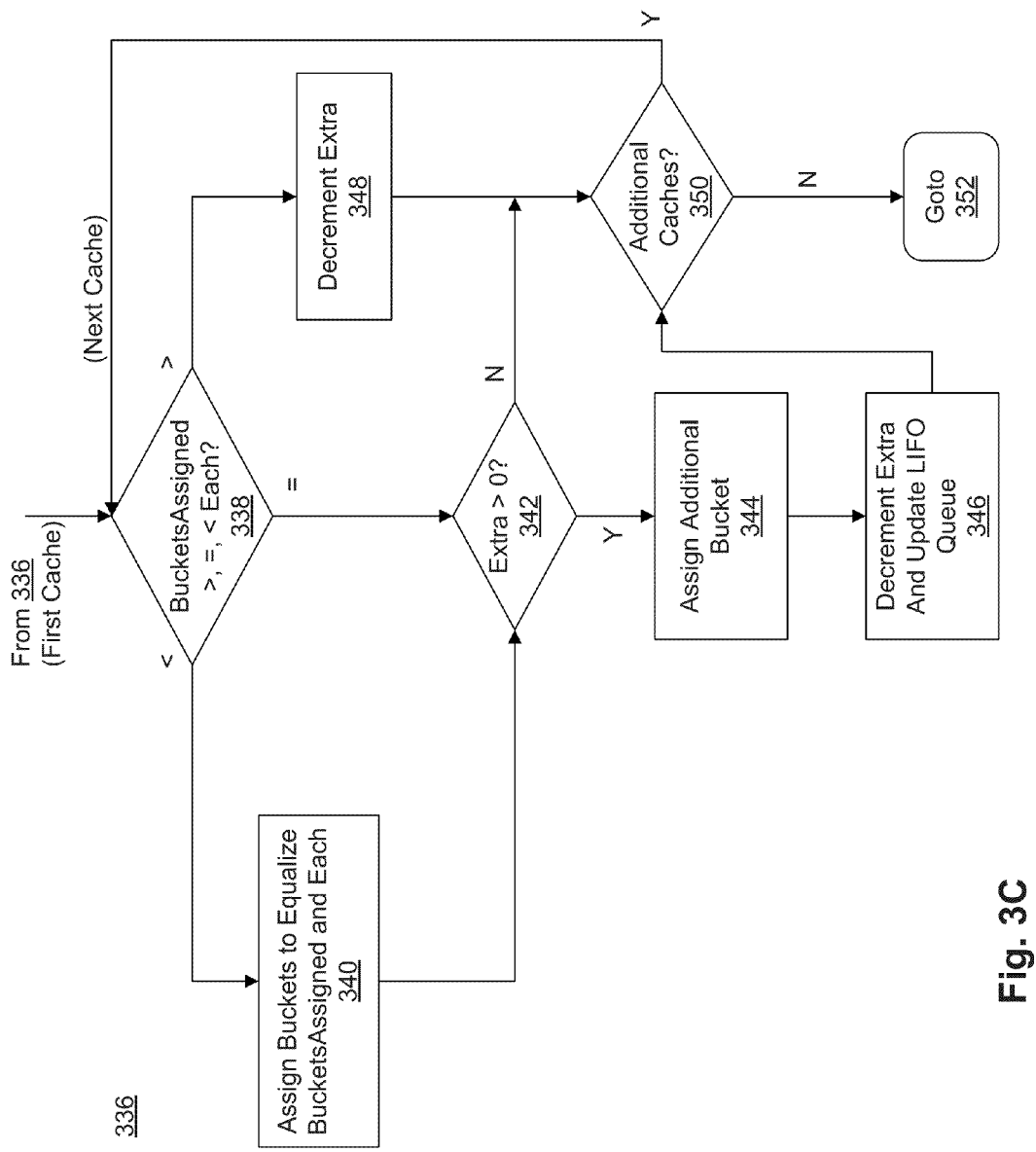

FIGS. 3A-3C are flowcharts of an exemplary LDA method 300. For discussion purposes, method 300 is described as performed by a cache appliance identified as a designated cache within a communication network, such as designated cache 109 in network 100. In some embodiments, method 300 can be performed by one or more other devices (not shown) within network 100 used for assigning cache appliances such as appliances 108.

In FIG. 3A, method 300 begins in step 302, when a designated cache (such as designated cache 109) detects identities of new caches added to the communication network (such as CachesAdded 252) and identities of caches removed from the communication network (such as CachesDeleted 254). In some embodiments, these identities may be IP addresses for the added and deleted caches. CachesAdded 252 and CachesDeleted 254 can include a quantity and identities of added and deleted caches that are newly-added or removed, respectively, and/or one or more identifiers for each changed cache such as CacheIP 216 or CacheIndex 218. The designated cache can also receive or recall a data structure (e.g., data structure 200) to retrieve cache information necessary for new assignment and reassignment (step not shown). In some embodiments, the designated cache can update data structure 200 with the added and deleted caches, such as by adding CacheIP 216 and CacheIndex 218 entries for newly-added caches, and removing CacheIP 216 and CacheIndex 218 entries for deleted caches (step not shown).

In some embodiments, the designated cache can detect values for CachesAdded 252 and CachesDeleted 254 based on information received from a router, such as an "I See You" message received from router 106. For example, the designated cache can identify a cache appliance as newly-added based on the I See You message received from the router. In such embodiments, the router includes the identities of all caches from which the router receives a "Here I Am" message known to those of ordinary skill in the art. The router periodically transmits the I See You message to the designated cache, and the designated cache can recognize an appliance as new by comparing the identifiers in the I See You message to one or more indexes, such as CacheIP map 206 or CacheIndex map 208, and determining that the new appliance is not currently indexed (steps not shown). Accordingly, the designated cache can identify the new appliance as newly-added, and add the identity of the new cache to CachesAdded 252.

If the router has not received any communication (such as subsequent "Here I Am" messages) from an appliance for a predetermined period of time, the router can assume the appliance is malfunctioning or was removed from the network. Accordingly, the router can remove the missing appliance from subsequent I See You messages transmitted to the designated cache. The designated cache can determine which appliance listed in the one or more indexes or maps (such a CacheIP map 206 or CacheIndex map 208) is not included in the most recent "I See You" message from the router, and identify the missing appliance as deleted, thereby including the missing appliance in the CachesDeleted 254 entry.

In step 304, the designated cache can update one or more maps (such a CacheIP map 206 or CacheIndex map 208) to remove all caches identified in CachesDeleted 254 and to add new caches identified in CachesAdded 252.

In step 306, the designated cache can update values for FreeQ 212 and NumberOfCaches 210. In some embodiments, the designated cache may identify the buckets previously assigned to the deleted caches, and move the bucket identifiers from the LIFO queue 220 (assigned) for each deleted cache to FreeQ 212 (unassigned/available to reassign). The designated cache also reduces the quantity of NumberOfCaches based on the deleted caches (step not shown). If any new caches are added, the designated cache increases the quantity of NumberOfCaches to reflect the addition(s). In some embodiments, step 306 may be performed simultaneously with step 304.

In step 308, the designated cache can free one or more additional buckets for assignment to newly added caches (CachesAdded). In some embodiments, step 308 may comprise substeps 310, 312, and 314, in which the designated cache calculates the variables "Each," "Extra," and "Need," respectively (shown in FIG. 3B). In steps 310-312, the designated cache can determine the number of buckets that may be assigned to each cache appliance based on the recently added and/or removed caches, and the minimum number of buckets that must be reassigned to accommodate newly added cache(s). By determining the minimum number of buckets to reassign, the disclosed embodiments minimize the impact on network 100 and increase efficiency, thereby increasing network performance.

In step 310, the designated cache calculates "Each" 256 by determining a number of buckets that each cache will have after the assignment, where Each 256 is a whole-number quotient of the equation Each 256=Size 204÷NumberOfCaches 210. For example, if Size=10 buckets, and NumberOfCaches=3 after the addition of cache C to caches A and B, then Each=3, the whole-number quotient of 10÷3.

In step 312, the designated cache calculates the remainder of the equation from step 310 and stores the remainder in the variable "Extra" 258. That is, Extra 258 is the remainder or Size÷NumberOfCaches. Expanding on the example above, Extra would equal 1, because the remainder of 10÷3 is 1. Notably, Extra 258 would not be equal to or greater than NumberOfCaches 210

Notably, Extra 258 is automatically set to 0 when the value of NumberOfCaches 210 is a multiple of Size 204. For example, when Size=10 buckets, and NumberOfCaches=2 caches, then Each=5, and Extra=0. When the calculated value of Extra is non-zero, the designated cache evenly distributes the quantity of Extra buckets among the caches.

In step 314, the designated cache can calculate a value of the variable "Need" 260, which represents a number of currently-assigned buckets that must be freed to accommodate newly-added caches. Need 260 can be determined by calculating the result of (Each×the quantity of CachesAdded)−the quantity of buckets in FreeQ 212. The value of Need 260 represents the minimum number of cache-bucket assignments that will be changed, and a determination of this variable allows the present embodiments to minimize disruption of all cache assignments when addressing newly-added caches.

At step 316, the designated cache can determine whether Need 260 is greater than zero. A Need value greater than zero indicates that there are cache assignments that must be changed. If Need=0 ("No" in step 316), then no cache reassignments are needed, and method 300 proceeds to step 334, (shown in FIG. 3A), to reset Extra to the value originally calculated at step 312. Need may equal 0 when, for example, a greater quantity of caches were deleted, compared to the quantity of caches added, resulting in a surplus of free buckets.

If Need 260 is greater than zero ("Yes" in step 316), then the designated cache can begin performing one or more cache reassignments by iterating through CacheIndex map 208 of the CacheDetails 214, by CacheIndex 218 number, and determining whether each cache assignment requires changes based on the calculated Each, Extra, and Need variables. Cache reassignment may begin in step 318 with a first cache in CacheIndex map 208 (such as appliance 108a), when the designated cache compares the quantity in BucketsAssigned 222 for the first cache with the determined quantity of "Each." That is, the designated cache can determine whether a quantity in BucketsAssigned 222 for the first cache is greater than, equal to, or less than the calculated value for Each.

If the quantity of BucketsAssigned for the first cache is less than or equal to the quantity of Each ("<" or "=" in step 318), then the first cache is already assigned the proper number of buckets, or fewer than the proper number of buckets, and thus no buckets are removed from the cache. Method 300 proceeds to step 332, to determine whether there are additional caches in the CacheIndex map, as described below.

If the quantity of BucketsAssigned for the first cache is greater than the quantity of Each (">" in step 318), then in step 320 the designated cache can determine a quantity of buckets to remove from the first cache for reassigning to the newly added cache(s), and store the determined quantity in a variable "ToRemove" 262, where ToRemove=Each−BucketsAssigned. That is, ToRemove 262 represents the difference between the quantity of buckets that will be assigned to each cache after assignment is complete (Each 256), minus the quantity of buckets currently assigned to the first cache (BucketsAssigned 222). For example, if cache A currently has 4 buckets assigned, and Each is determined to be 2 buckets, then ToRemove=2 buckets.

In step 322, the designated cache can determine whether Extra is greater than 0. As discussed earlier, Extra is the remainder of Size÷NumberOfCaches. That is, when there is a remainder in the expression (Size÷NumberOfCaches), then extra buckets are preferably distributed as evenly as possible. If Extra=0 ("No" in step 322), then in step 328 the designated cache can remove a quantity of buckets from the cache equal to ToRemove. The buckets may be removed from LIFO queue 220 and pushed to FreeQ 212.

Returning to step 322, if Extra>0 and there is a remainder ("Yes" in step 324), then in step 326 one additional bucket is assigned to the cache, and the quantity of variable Extra is decremented by one. The quantity of variable ToRemove is also temporarily decremented by one, because this cache is allowed to have one of these extra buckets. Thereafter, the designated cache can remove a quantity of buckets from the cache equal to the decremented value of ToRemove (step 328).

The designated cache can store updated values for Extra 258 and BucketsAssigned 222 in step 330. Notably, the designated cache can store the decremented value for Extra 258 for subsequent use with additional caches, but the stored value of ToRemove is not decremented for additional caches, as ToRemove is calculated individually for each cache taken under consideration.

As an example, if cache A is assigned 5 buckets (BucketsAssigned=5), Each is calculated to be 2, and Extra is calculated to be 2, then steps 320-328 would proceed as follows. In step 320, the designated cache would determine that ToRemove=3 buckets, based on the difference between BucketsAssigned (5) and Each (2). In step 322, the designated cache would determine that Extra is greater than zero ("Yes" in step 322), causing method 300 to proceed to step 326. In step 326, the designated cache would assign one of the two extra buckets to cache A, and decrement the stored value of Extra by one. The designated cache would also temporarily decrement the value of ToRemove by one, resulting in a value of 2. Thereafter, the designated cache would remove 2 bucks from cache A (step 328), and move the buckets to FreeQ 212, leaving cache A with 3 buckets. Finally, in step 330, the designated cache would store the updated value of Extra (Extra=1) for use in processing the next cache, and the updated value for BucketsAssigned for cache A (3). The value of ToRemove is reset and is calculated separately for the next cache.

In step 332, the designated cache can determine whether there are additional caches in the CacheIndex map. If so ("Yes" in step 332), then steps 318-330 are iteratively repeated for each additional cache, using the updated value for Extra, and a newly-calculated value for ToRemove for each additional cache. Once there are no additional caches ("No" in step 332), then process 300 proceeds to step 334 (Shown in FIG. 3A).

Upon beginning step 334, FreeQ 212 may contain all buckets previously assigned to caches that left the service group, and/or buckets removed from an existing cache's assignment for reassigning to new caches.

Referring again FIG. 3A, in step 334, the designated cache can reset the "Extra" variable to the value originally calculated at step 312, then again iterate through the "CacheIndex" map of CacheDetail. In step 336, the designated cache can assign free buckets to the caches, by performing steps 338-350 (shown in FIG. 3C), compare each cache's current assignment (BucketsAssigned) with the quantity of variables "Each" and "Extra."

At step 336, the designated cache can consider the first cache in the CacheIndex map, and compare the quantity of buckets currently assigned to the first cache (BucketsAssigned) to the value of Each (step 338), to determine whether BucketsAssigned <, =, or > Each.

If BucketsAssigned is less than Each ("<" in step 338), then in step 340 the designated cache can assign a quantity of buckets from FreeQ 212 to the cache, to equalize BucketsAssigned and Each. For example, if cache A has 2 buckets (BucketsAssigned=2), and Each=4, the designated cache can reassign 2 buckets from FreeQ to cache A, resulting in BucketsAssigned=4. The reassignment may be reflected in an updated LIFO queue 220 in the CacheDetail 214 for the cache appliance (step not shown).

In step 342, the designated cache can determine whether Extra >0, and if so, the designated cache can assign an additional free bucket from FreeQ to the first cache (step 344). Upon reassignment, Extra is decremented by one, and LIFO queue may be updated to reflect the extra bucket reassignment (step 346). Method 300 may then proceed to step 350, to determine whether CacheIndex map 208 contains additional cache appliances for consideration. If Extra is not greater than 0 ("No" in step 342), then there are no additional buckets requiring assignment, and method 300 proceeds to step 350 to determine whether CacheIndex map 208 contains additional cache appliances (such as appliances 108b-108d) for consideration.

Returning to step 338, if BucketsAssigned is equal to Each ("=" in step 338), then the designated cache can determine whether Extra >0 (step 342). If Extra >0 ("Yes" in step 342), the designated cache can assign an additional free buckets from FreeQ 212 to the first cache appliance (step 344). Upon reassignment, Extra is decremented by one, and LIFO queue is updated to reflect the extra bucket reassignment (step 346). Method 300 then proceeds to step 350, to determine whether the CacheIndex map 208 contains additional cache appliances (such as appliances 108b-108d) for consideration. If Extra is not greater than 0 ("No" in step 342), then there are no additional buckets requiring assignment, and method 300 proceeds to step 350 to determine whether CacheIndex map 208 contains additional cache appliances (such as appliances 108b-108d) for consideration.

Returning again to step 338, if BucketsAssigned is greater than Each (">" in step 338), then the cache is already assigned more buckets than the quantity designated for even bucket distribution. The designated cache can decrement the value of Extra because the cache already has the extra bucket allocated (step 348). The decremented value of Extra may be stored for processing subsequent caches (step not shown). Method 300 may then proceed to step 350, to determine whether the CacheIndex map 208 contains additional cache appliances for consideration.

In step 350, the designated cache can determine whether there are additional caches in CacheIndex map 208, and if so ("Yes" in step 350), then the designated cache can repeat steps 338-350 for each additional cache appliance listed in CacheIndex map 208. After no additional caches remain ("No" in step 350), then process 300 may proceed to step 352.

Referring again to FIG. 3A, in step 352 the designated cache can update AssignTable 202 to reflect all updated cache-bucket assignments. In step 354, the designated cache can store and transmit the updated AssignTable 202 to another device in the network, such as router 106 in network 100, to configure subsequent data routing over network 100. Thereafter, method 300 may end, until another cache addition or deletion is detected in network 100.

Figure 4:
FIG. 4 is a chart illustrating a first exemplary cache assignment, consistent with the embodiments of the present disclosure.
Figure 5:
FIG. 5 is a chart illustrating a second exemplary cache assignment, consistent with the embodiments of the present disclosure.

FIGS. 4 & 5 illustrate exemplary executions of method 300 in various scenarios. These examples are purely illustrative, and are not meant to limit the steps of method 300 in any way.

FIG. 4 is a chart illustrating a first exemplary cache assignment. In the example network 100 contains 4 buckets (Size=4, having buckets 0, 1, 2, and 3). The chart shows time progressing left to right as caches arrive to the network in the order A, B, C, and D. The shaded cells mark the cells that changed from the column to the left.

In the first assignment by method 300 (column 402), cache A is added to the network, and no other caches are present. Size=4, NumberOfCaches=1, FreeQ=4 (no current bucket-cache assignments). Each is calculated to be 4 (4÷1), Extra is calculated to be 0 (no remainder in the expression 4÷1), and Need is calculated to be 0 ((4×1)−4). All four buckets are assigned to cache A.

In the second assignment (column 404), cache B is added to the network, and cache A remains. Size=4, NumberOfCaches=2, and FreeQ=0 (all buckets are currently assigned to cache A). Each is calculated to be 2 (4÷2), Extra is calculated to be 0 (no remainder in the expression 4÷2), and Need is calculated to be 2 ((2×1)−0). CacheDetail 214 for cache A is queried, informing designated cache 109 that BucketsAssigned=4. ToRemove is calculated to be 2 (difference between 2 and 4). Two buckets are removed from cache A, and moved to FreeQ. New cache B is considered, and two buckets from FreeQ are assigned to cache B. Two buckets remain assigned to cache A (buckets 2 and 3), and the assignment is unaffected by the addition of Cache B.

In the third assignment (column 406), cache C is added to the network, and caches A and B remain. Size=4, NumberOfCaches=3, and FreeQ=0 (all buckets are currently assigned to caches A and B). Each is calculated to be 1 (4÷3), Extra is calculated to be 1 (the remainder in the expression 4÷3 is 1), and Need is calculated to be 1 ((1×1)−0). CacheDetail 214 for cache A is queried, informing designated cache 109 that BucketsAssigned=2. ToRemove is calculated to be 0 (difference between 1 and 2, negated by the Extra bucket). No buckets are removed from cache A, and Extra is decremented to 0. CacheDetail 214 for cache B is queried, informing designated cache 109 that BucketsAssigned=2. ToRemove is calculated to be 1 (difference between 1 and 2). One bucket is removed from cache B, and moved to FreeQ. New cache C is considered, and one bucket from FreeQ is assigned to cache C. Two buckets remain assigned to cache A (buckets 2 and 3), one bucket to cache B (cache 1), and one bucket to cache C (bucket 0). Despite the addition of cache C, only 1 bucket out of 4 requires reassignment. Prior "sorted list" assignment methods may result in the reassignment of all buckets upon adding a new cache appliance.

In the fourth assignment (column 406), cache D is added to the network, and caches A, B, and C remain. Size=4, NumberOfCaches=4, and FreeQ=0 (all buckets are currently assigned to caches A, B, and C). Each is calculated to be 1 (4÷4), Extra is calculated to be 0 (no remainder in the expression 4÷4), and Need is calculated to be 1 ((1×1)−0). CacheDetail 214 for cache A is queried, informing designated cache 109 that BucketsAssigned=2. ToRemove is calculated to be 1 (difference between 1 and 2). One bucket is removed from cache A, and moved to FreeQ. CacheDetail 214 for cache B is queried, informing designated cache 109 that BucketsAssigned=1. ToRemove is calculated to be 0 (difference between 1 and 1). No buckets are removed from cache B. CacheDetail 214 for cache C is considered, informing designated cache 109 that BucketsAssigned=1. ToRemove is calculated to be 0 (difference between 1 and 1), and no buckets are removed from cache C. Finally, CacheDetail 214 for cache D is queried, informing designated cache 109 that BucketsAssigned=0. One bucket is moved from FreeQ is assigned to cache D. At the end of the fourth assignment, all four caches A-D contain one bucket, with minimal reassignment of the buckets.

Upon completing each assignment, the designated cache can update AssignTable 202, and transmit AssignTable 202 and/or the entire data structure 200 to router 106 for configuring network 100.

FIG. 5 is a chart illustrating a second exemplary cache assignment. In the example network 100 contains 8 buckets (Size=8, having buckets 0-7). The chart shows time progressing left to right as caches arrive to the network in the order A, B, C, and D, followed by C leaving the network. The shaded cells mark the cells that changed from the column to the left. The first two assignments (columns 502 and 504) closely resemble the first two assignments of FIG. 4, except the quantity of buckets is doubled.

In the first assignment (column 502), cache A is added, and all 8 buckets (0-7) are assigned to cache A.

In the second assignment (column 504), cache B is added, and cache A remains. Similar to column 404 of FIG. 4, 50% of the buckets are reassigned from cache A to cache B.

In the third assignment (column 506), cache C is added, and caches A and B remain. Size=8 (buckets 0-7), NumberOfCaches=3, and FreeQ=0 (all buckets are currently assigned to caches A and B). Each is calculated to be 2 (8÷3), Extra is calculated to be 2 (the remainder in the expression 8÷3 is 2), and Need is calculated to be 2 ((2×1)−0). CacheDetail 214 for cache A is queried, informing designated cache 109 that BucketsAssigned=4. ToRemove is calculated to be 1 (difference between 2 and 4, decremented by an Extra bucket). One bucket is removed from cache A and moved to FreeQ, and Extra is decremented to 1. CacheDetail 214 for cache B is queried, informing designated cache 109 that BucketsAssigned=4. ToRemove is calculated to be 1 (difference between 2 and 4, decremented by the remaining Extra bucket). One bucket is removed from cache B, and moved to FreeQ. New cache C is considered, and two buckets from FreeQ are assigned to cache C. Upon completion, three buckets remain assigned to each of caches A and B, and cache C contains two buckets. The buckets are evenly distributed amongst the caches, in a manner that results in minimal disruption during reassignment.

In the fourth assignment (column 508), cache D arrives, and caches A, B, and C remain. Size=8, NumberOfCaches=4, and FreeQ=0 (all buckets are currently assigned to caches A, B, and C). Each is calculated to be 2 (8÷4), Extra is calculated to be 0 (no remainder in the expression 8÷4), and Need is calculated to be 2 ((2×1)−0). CacheDetail 214 for cache A is queried, informing designated cache 109 that BucketsAssigned=3. ToRemove is calculated to be 1 (difference between 2 and 3). One bucket is removed from cache A and moved to FreeQ. CacheDetail 214 for cache B is queried, informing designated cache 109 that BucketsAssigned=3. ToRemove is calculated to be 1 (difference between 2 and 3). One bucket is removed from cache B, and moved to FreeQ. CacheDetail 214 for cache C is queried, informing designated cache 109 that BucketsAssigned=2. ToRemove is calculated to be 0 (difference between 2 and 2), and thus no buckets are removed from cache C. New cache D is considered, and two buckets from FreeQ are assigned to cache D. Upon completion, caches A-D are assigned two buckets each, but only two reassignments were required, as opposed to a potential 8 reassignments using the prior "sorted list" methods.

In the fifth assignment (column 510), cache C leaves the network, either due to removal of the cache appliance by a network administrator, or appliance malfunction/failure. CachesDeleted 254 indicates the removal of cache C, triggering LDA method 300. Size=8, NumberOfCaches=3, and FreeQ=2 (two buckets previously assigned to cache C are moved to FreeQ for reassignment). Each is calculated to be 2 (8÷3), Extra is calculated to be 2 (the remainder in the expression 8÷3 is 2), and Need is calculated to be 0 ((2×0 caches added)−2 caches in FreeQ, then automatically set to 0). CacheDetail 214 for cache A is queried, informing designated cache 109 that BucketsAssigned=2. Because BucketsAssigned=Each, and Extra >0, one additional bucket from FreeQ is reassigned to cache A, and Extra is decremented to 1. CacheDetail for cache B is then queried, informing designated cache that BucketsAssigned=2. Again, an additional bucket from FreeQ is reassigned to cache B, and Extra is decremented to 0. CacheDetail for cache D is then queried, informing designated cache 109 that BucketsAssigned=2. Extra now equals 0, because all buckets from FreeQ have been reassigned to caches A and B. Therefore, cache D remains unchanged. Upon completion of the fifth assignment, caches A and B have 3 buckets each, and cache D is assigned two buckets. Again, only two reassignments are required, whereas the traditional "sorted list" methods would reassign all 8 buckets due to the first two buckets in the list (buckets 0 and 1) being reassigned.

As illustrated by the examples in FIGS. 4 & 5, the least disruptive assignment methods disclosed herein provide efficient cache assigning, with minimal changes to the entire network configuration, thereby reducing the risk of data loss and increasing network performance.

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, DVD-ROM (digital versatile disk-read only memory), a DVD RAM (digital versatile disk-random access memory), or a semiconductor memory. Alternatively, the methods can be implemented in hardware components or combinations of hardware and software of a data processing apparatus, e.g. a programmable processor, a computer, or multiple computers. The computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A cache management device comprising:
   a memory having instructions stored therein; and
   one or more processors configured to communicate with the memory and capable of executing the instructions to cause the cache management device to:
      determine a first cache quantity of memory caches in the communication network;
      determine a second cache quantity of changed memory caches, the changed memory caches including at least one cache added to the communication network or at least one cache deleted from the communication network;
      determine a third cache quantity based on the first cache quantity and the second cache quantity;
      determine a first bucket quantity of storage buckets in the communication network;
      determine, based on the third cache quantity and the first bucket quantity, a second bucket quantity of buckets to be assigned to each cache of the third cache quantity;
      reassign one or more buckets assigned to each cache of the third cache quantity based on the second bucket quantity, wherein the one or more buckets are selected first from a quantity of unassigned buckets, and second from an assigned quantity of buckets.

2. The cache management device of claim 1, wherein the third cache quantity comprises an amount of caches remaining in the communication network after the quantity of changed caches are added to and/or removed from the communication network.

3. The cache management device of claim 1, wherein the instructions configure the one or more processors to reassign the one or more buckets by:
   receiving first details of a first cache in the third cache quantity;
   determining a fourth bucket quantity of buckets assigned to the first cache based on the first details;
   determining a difference between the third bucket quantity and the fourth bucket quantity; and
   adjusting the fourth bucket quantity based on the difference.

4. The cache management device of claim 3, wherein the instructions configure the one or more processors to adjust the fourth bucket quantity by:

assigning one or more additional buckets to the first cache when the fourth bucket quantity is less than the third bucket quantity; and reassigning one or more buckets from the first cache when the fourth quantity is greater than the third bucket quantity.

5. The cache management device of claim 1, wherein the quantity of unassigned buckets comprise buckets previously assigned to the at least one cache deleted from the network.

6. A method, performed by one or more processors, for generating mapping information for assigning memory caches in a communication network, comprising:

determining a first cache quantity of memory caches in the communication network;

determining a second cache quantity of changed memory caches, the changed memory caches including at least one cache added to the communication network or at least one cache deleted from the communication network;

determining a third cache quantity based on the first cache quantity and the second cache quantity;

determining a first bucket quantity of storage buckets in the communication network;

determining, based on the third cache quantity and the first bucket quantity, a second bucket quantity of buckets to be assigned to each cache of the third cache quantity; and reassigning one or more buckets assigned to each cache of the third cache quantity based on the second bucket quantity, wherein the one or more buckets are selected first from a quantity of unassigned buckets, and second from an assigned quantity of buckets.

7. The method of claim 6, wherein the third cache quantity comprises an amount of caches remaining in the communication network after the quantity of changed caches are added to and/or removed from the communication network.

8. The method of claim 6, wherein reassigning comprises:

receiving first details of a first cache in the third cache quantity;

determining a fourth bucket quantity of buckets assigned to the first cache based on the first details;

determining a difference between the third bucket quantity and the fourth bucket quantity; and adjusting the fourth bucket quantity based on the difference.

9. The method of claim 8, wherein adjusting comprises:
assigning one or more additional buckets to the first cache when the fourth bucket quantity is less than the third bucket quantity; and reassigning one or more buckets from the first cache when the fourth quantity is greater than the third bucket quantity.

10. The method of claim 6, wherein the quantity of unassigned buckets comprises buckets previously assigned to the at least one cache deleted from the network.

11. A non-transitory computer readable medium having stored therein instructions that are executable by one or more processors of an appliance to cause the appliance to perform a method for assigning memory caches in a communication network, the method comprising:

determining a first cache quantity of memory caches in the communication network;

determining a second cache quantity of changed memory caches, the changed memory caches including at least one cache added to the communication network or at least one cache deleted from the communication network;

determining a third cache quantity based on the first cache quantity and the second cache quantity;

determining a first bucket quantity of storage buckets in the communication network;

determining, based on the third cache quantity and the first bucket quantity, a second bucket quantity of buckets to be assigned to each cache of the third cache quantity;

reassigning one or more buckets assigned to each cache of the third cache quantity based on the second bucket quantity, wherein the one or more buckets are selected first from a quantity of unassigned buckets, and second from an assigned quantity of buckets.

12. The non-transitory computer readable medium of claim 11, wherein the third cache quantity comprises an amount of caches remaining in the communication network after the quantity of changed caches are added to and/or removed from the communication network.

13. The non-transitory computer readable medium of claim 11, wherein reassigning the one or more buckets includes:

receiving first details of a first cache in the third cache quantity;

determining a fourth bucket quantity of buckets assigned to the first cache based on the first details;

determining a difference between the third bucket quantity and the fourth bucket quantity; and adjusting the fourth bucket quantity based on the difference.

14. The non-transitory computer readable medium of claim 13, wherein adjusting the fourth bucket quantity includes:

assigning one or more additional buckets to the first cache when the fourth bucket quantity is less than the third bucket quantity; and reassigning one or more buckets from the first cache when the fourth quantity is greater than the third bucket quantity.

15. The non-transitory computer readable medium of claim 11, wherein the quantity of unassigned buckets comprise buckets previously assigned to the at least one cache deleted from the network.

* * * * *